United States Patent [19]
Suptitz et al.

[11] Patent Number: 5,877,691
[45] Date of Patent: Mar. 2, 1999

[54] CIRCUIT BREAKER WITH A CIRCUIT BREAKER UNIT AND PROCESSING, CALIBRATION AND COMMUNICATION MODULES

[75] Inventors: Eric Suptitz, Grenoble; Henri Bellotto, St. Martin d'Heres; Luc Weynachter, Grenoble; Patrice Allin, Meylan, all of France

[73] Assignee: Schneider Electric SA, France

[21] Appl. No.: 955,703

[22] Filed: Oct. 23, 1997

[30] Foreign Application Priority Data

Nov. 15, 1997 [FR] France ................................... 96 14171

[51] Int. Cl.⁶ .................................................. G08B 21/00
[52] U.S. Cl. .......................... 340/638; 340/635; 335/17; 361/87; 361/93; 361/96
[58] Field of Search .................................... 340/638, 639, 340/635, 644, 825.06, 825.16; 335/17, 18, 14; 361/87, 96, 93, 97

[56] References Cited

U.S. PATENT DOCUMENTS

| | | | |
|---|---|---|---|
| 3,529,292 | 9/1970 | Neill et al. | 340/638 |
| 4,358,810 | 11/1982 | Wafer et al. | 361/93 |
| 4,780,786 | 10/1988 | Weynachter et al. | 361/87 |
| 4,780,787 | 10/1988 | Dano et al. | 361/96 |
| 5,502,435 | 3/1996 | Ralston | 340/632 |
| 5,555,456 | 9/1996 | Waite | 340/638 |

FOREIGN PATENT DOCUMENTS

| | | |
|---|---|---|
| 0641055 | 3/1995 | European Pat. Off. . |
| 2583569 | 12/1986 | France . |
| 2703506 | 10/1994 | France . |
| 9105489 | 10/1992 | Germany . |

*Primary Examiner*—Nina Tong
*Attorney, Agent, or Firm*—Parkhurst & Wendel

[57] ABSTRACT

The circuit breaker comprises a circuit breaker unit onto which there are fixed a communication module, a processing module and a calibration module. The communication module communicates with the processing module only via a connection with galvanic isolation, preferably an optical connection, whereas the calibration module is electrically connected to the processing module. The communication module is, in addition, connected by a mechanical connection to parts of the circuit breaker unit representative of the state of the circuit breaker, and by a bidirectional electrical connection to an external communication bus. An interface connected to the circuit breaker unit can act as support for the calibration module and for an additional module containing information representative of the breaking capacity of the circuit breaker and electrically connected to the processing module.

12 Claims, 7 Drawing Sheets

CIRCUIT BREAKER WITH A CIRCUIT BREAKER UNIT AND PROCESSING, CALIBRATION AND COMMUNICATION MODULES

BACKGROUND OF THE INVENTION

The invention relates to a circuit breaker comprising a circuit breaker unit, a removable processing module comprising an electronic processing unit and mechanically and electrically connected to the circuit breaker unit, a removable calibration module, comprising calibrating means, mechanically fixed to the circuit breaker unit and electrically connected to the processing unit, and communication means connected to an external communication bus.

It is known to use a circuit breaker with different types of electronic trip devices. These trip devices are generally removable and are only fitted in the circuit breaker when the latter is installed.

SUMMARY OF THE INVENTION

The object of the invention is to improve the interchangeability of the trip devices so as to meet the demand, going from basic protection to the data logger.

According to the invention, this object is achieved by the fact that the circuit breaker comprises at least one removable communication module, distinct from the processing and calibration modules, comprising said communication means, mechanically fixed to the circuit breaker unit and connected to the processing unit by connection means with galvanic isolation, preferably optical, to parts of the circuit breaker unit representative of the state of the circuit breaker by mechanical connection means and to the external communication bus by electrical input/output connection means.

The communication module can comprise indication means connected by the mechanical connection means to the circuit breaker unit, and remote measurement and/or remote setting means connected by the optical connection means to the processing unit, the indication, remote measurement and/or remote setting means being connected to the external communication bus by the electrical input/output connection means.

It is also possible for the communication module to comprise control means electrically connected to control auxiliaries of the circuit breaker, the control means being connected to the external communication bus by the electrical input/output connection means.

According to a development of the invention, the electrical input/output connection means comprise in the communication module means suited to a communication bus of predetermined type.

According to another development of the invention, the means for mechanical connection of the communication module to the parts of the circuit breaker unit representative of the state of the circuit breaker comprise microcontacts arranged in the communication module and having control parts protruding out from a panel of the communication module opposite the circuit breaker unit, and in the circuit breaker unit means for mechanical actuation of said control parts, the communication module comprising means for transforming the mechanical signals from the microcontacts into electrical signals and means for indicating the state of the circuit breaker. The control parts of the microcontacts preferably each comprise a flexible, tight membrane covering the corresponding microcontact.

Locating the communication functions in a communication module distinct from the processing and calibration modules enables the circuit breaker to be adapted to different communication protocols without multiplying the variety of the processing modules. In addition, the independence of the communication module and its direct connection, by a mechanical link, to parts of the circuit breaker unit representative of the state of the circuit breaker enable the communication module to perform certain functions, notably indication functions, autonomously as soon as it is physically connected to the circuit breaker unit, even in the absence of the processing module.

According to a development of the invention, the circuit breaker unit comprising current measurement means formed by Rogowski toroids whose output is connected to the processing module, the calibration module fitted in removable manner on the circuit breaker unit comprises a front panel with indications representative of the circuit breaker rating.

Furthermore, the processing module comprising analog final instantaneous protection means connected to current sensors of the circuit breaker unit and designed to compare an analog maximum instantaneous threshold to a value representative of the current supplied by the current sensors, the circuit breaker can comprise an additional module comprising means for adjusting said threshold according to the type of circuit breaker, said additional module being mechanically fixed in unremovable manner on the circuit breaker unit, electrically connected to the processing unit and comprising a panel containing indications representative of the breaking capacity of the circuit breaker.

According to an alternative embodiment, the circuit breaker comprises means for fitting the calibration module and the additional module, said means for fitting comprising an interface securedly affixed to the circuit breaker unit and comprising guiding means and fixing means complementary to guiding means and fixing means of the calibration module and additional module.

BRIEF DESCRIPTION OF THE DRAWINGS

Other advantages and features will become more clearly apparent from the following description of the different embodiments given as non-restrictive examples only and represented in the accompanying drawings in which.

DETAILED DESCRIPTION OF THE PREFERRED EMBODIMENT

Figure 1:
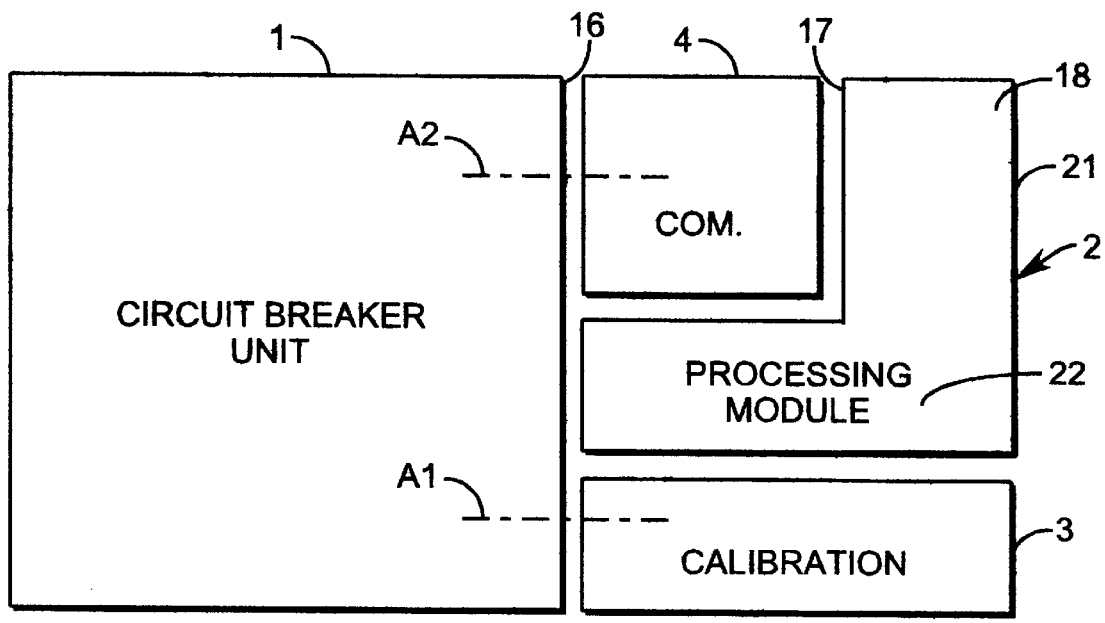
FIG. 1 illustrates, in schematic manner, the arrangement of the different modules making up a circuit breaker according to the invention.
Figure 2:
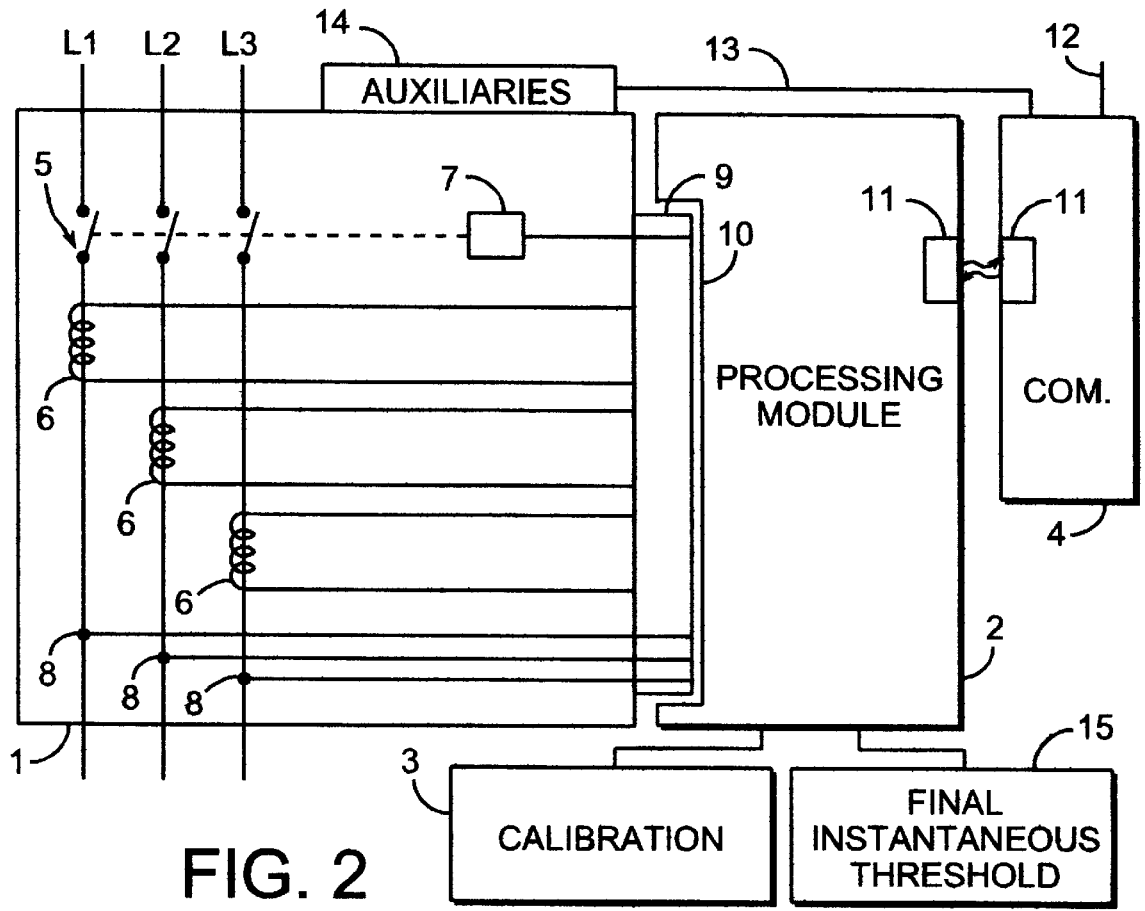
FIG. 2 represents the electrical and optical connections between the different modules of the circuit breaker according to FIG. 1.

As represented in FIGS. 1 and 2, the circuit breaker according to the invention comprises a circuit breaker unit 1, a processing module 2, a calibration module 3 and a communication module 4.

In FIG. 2, only the parts of the circuit breaker unit indispensable for understanding the invention have been represented. In known manner, the conductors L1, L2, L3 to be protected pass through the circuit breaker unit and can be interrupted by breaking contacts 5. Current sensors 6 are arranged on each conductor. A trip coil 7 controls opening of the contacts 5. The processing module 2 is electrically connected to the circuit breaker unit 1 which, on output of the current sensors 6, supplies it with signals representative of the currents flowing in the conductors L1, L2 and L3. The circuit breaker unit can also comprise voltage sensors 8 so as to supply to the module 2 the values of the voltages between the conductors L1, L2 and L3. The trip coil 7 brings about opening of the contacts 5 when it receives tripping signals from the processing module 2. Complementary electrical connectors, schematically represented by 9 and 10 in FIG. 2 and arranged respectively on the circuit breaker unit and on the processing module, provide these electrical connections when the processing module is mechanically connected to the circuit breaker unit.

The calibration module 3 is mechanically connected to the circuit breaker unit by any suitable fixing means schematically represented in FIG. 1 by a fixing axis A1. The calibration module does not comprise any electrical connection with the circuit breaker unit. It is on the other hand electrically connected (FIG. 2) to the processing module 2 in such a way as to supply the latter with information representative of the circuit breaker rating.

The communication module 4 is mechanically fixed to the circuit breaker unit 1 by any suitable fixing means, schematically represented in FIG. 1 by a fixing axis A2. It is physically totally independent from the other modules and is connected to the processing module 2 by an optical coupling only. This coupling is bidirectional and comprises complementary optical transmitter/receiver elements 11 in each of the modules 2 and 4. The communication module 4 is connected to a bidirectional external communication bus 12. It can also be electrically connected by an electrical connection 13 to auxiliaries 14 controlling the circuit breaker. In conventional manner, such auxiliaries, formed for example by circuit breaker opening and/or closing coils, are arranged on the circuit breaker unit 1. This direct electrical connection between the communication module and the auxiliaries enables the circuit breaker to be controlled by means of the bus 12, the communication module 4, the electrical connection 13 and the auxiliaries 14, even in the absence of the processing module 2.

Moreover, the communication module 4 is connected by mechanical connection means, which will be described in greater detail with reference to FIGS. 5 and 6, to parts of the circuit breaker unit 1 which are representative of the state of the circuit breaker. The communication unit 4 can thus perform circuit breaker state indication functions, in autonomous manner, even in the absence of the processing module.

An additional module 15, physically affixed to the circuit breaker unit 1 is represented in FIG. 2. Its nature and function will be described in greater detail with reference to FIGS. 7 and 9.

Figure 3:
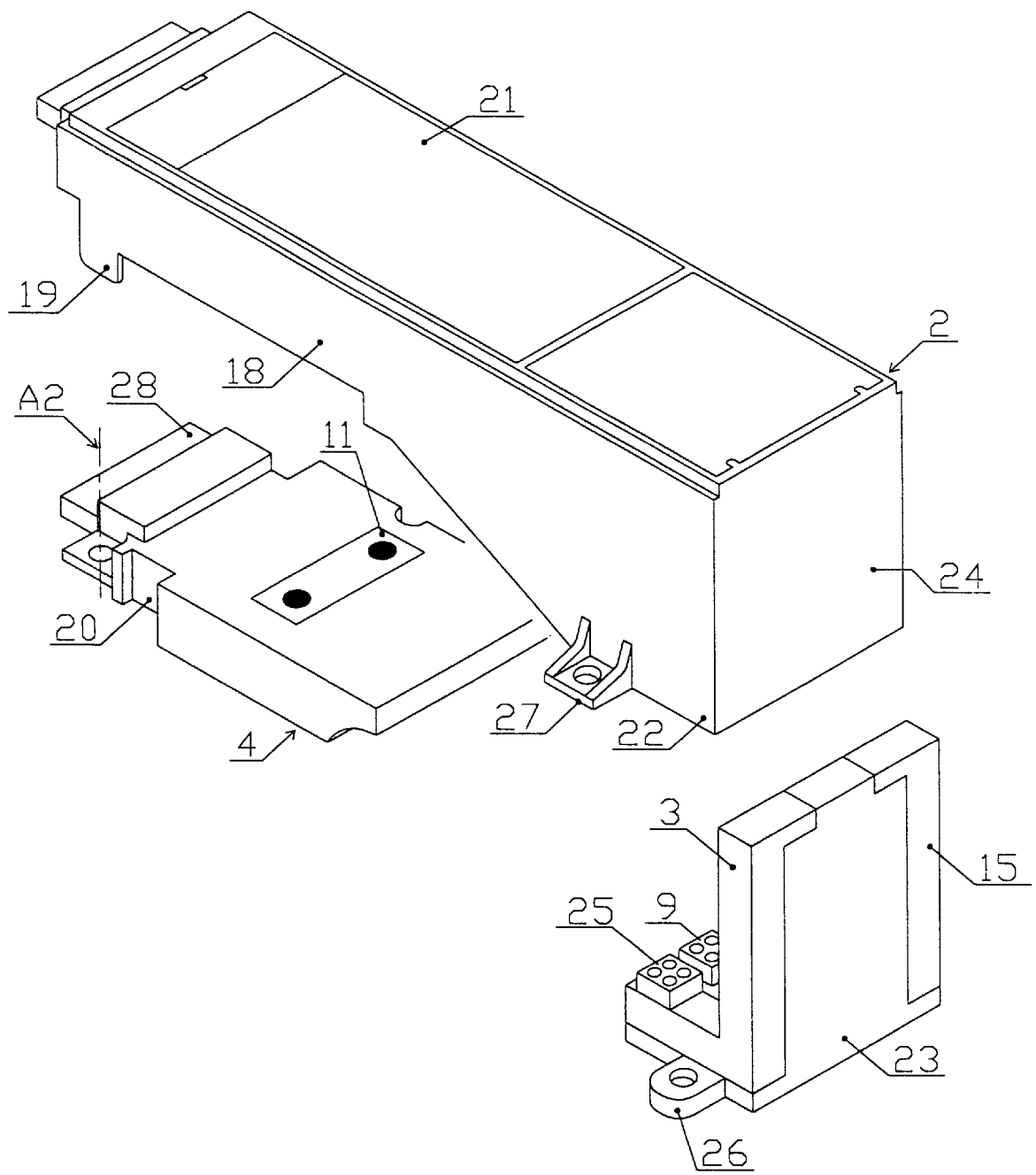
FIG. 3 illustrates, in exploded form, the positioning of the different modules in a particular embodiment.

The relative positioning of the different modules is illustrated in schematic manner in FIG. 1, and in exploded manner in the particular embodiment of FIG. 3. The communication module 4 is arranged between a panel 16 of the circuit breaker unit and the rear panel 17 of a less thick part 18 of the processing module 2. Positioning of the optical link between the complementary transmitters-receivers 11 of the communication module 4 and processing module 2 is performed by complementary guide means 19 and 20 provided respectively on the processing and communication modules.

The front panel 21 of the processing module 2 constitutes the visible face of the trip unit when the latter is mounted on the circuit breaker unit. The processing module rests via its wider bottom part 22 on a base. In a preferred embodiment (FIGS. 3 and 7), this base is formed by an interface 23 to which the calibration module 3 and additional module 15 are fixed. The base, in the general shape of a bracket, comprises a first appreciably flat part on which the bottom face 24 of the processing module rests, and a second part, perpendicular to the first, designed to be fixed (fixing lugs 26) to the panel 16 of the circuit breaker unit. The second part of the base comprises connectors 25 and 9 designed to cooperate with corresponding connectors of the processing module 2 so as to achieve the necessary electrical connections between the processing module 2 and the calibration module 3, the additional module 15 or the circuit breaker unit 1 by means of the interface 23.

The electrical connectors 9, 25 connecting the processing module 2 to the base and the guide means 19, 20 also constitute means for mechanical fixing of the processing module 2 onto the circuit breaker unit when the interface 23 and communication module 4 are fixed thereto. To ensure a good mechanical stability, additional fixing means can be provided. In FIG. 3 such means are represented schematically by a fixing lug 27.

In the particular embodiment of FIG. 3, electrical connection of the communication module to the bus 12 and auxiliaries 14 by the conductor 13 is achieved by means of the connector 28 situated at the upper part of the module 4.

Figure 4:
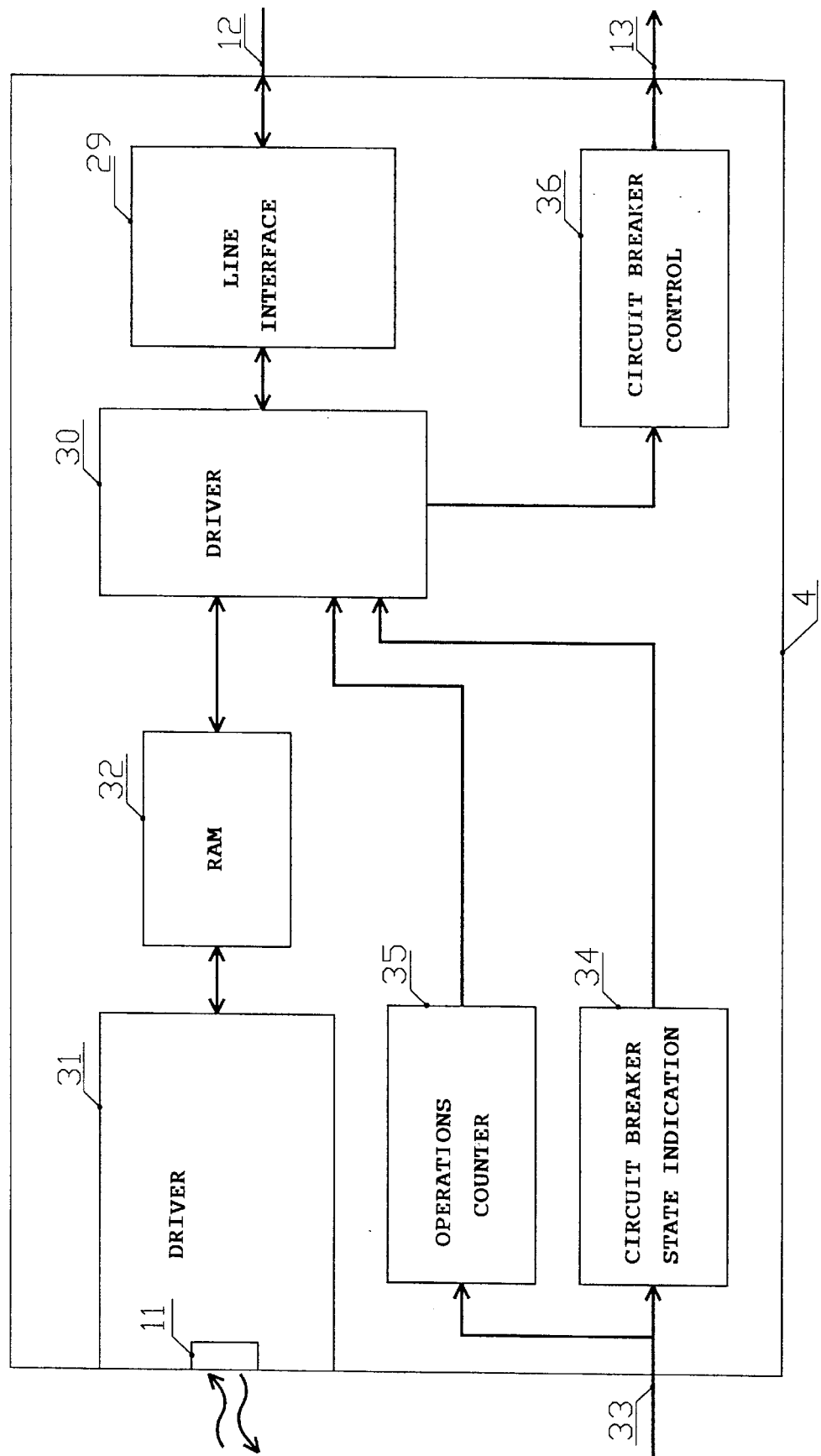
FIG. 4 represents, in block diagram form, a particular embodiment of the communication module of the circuit breaker according to FIGS. 1 to 3.

The communication module 4 of FIG. 4 is suited to a bus 12 of predetermined type. It comprises a line interface 29 connected to the bus 12 and a driver 30 connected by a bidirectional link to the line interface 29, both suitable for a bus of predetermined type. The other components of the communication module are standard and only the driver 30 and interface 29 have to be adapted to the type of bus chosen. As non-restrictive examples the bus may be of the BatiBUS, FIP, JBUS, etc. type.

Moreover, the module 4 comprises a driver 31 connected by the bidirectional optical connection to the processing module and constituting a communication interface with the processing unit. The optical transmitter-receiver 11 of the module 4 belongs to the driver 31. The drivers 30 and 31 are both connected by bidirectional links to a random access memory 32 (RAM), which is thus shared between the communication module and the processing module. A communication is thus obtained between the bus 12 and processing module 2 by means of the communication module 4 and optical link. It is thus possible to read and write data in the processing module and to perform functions of remote measurement (from the processing module to the bus), remote setting (from the bus to the processing module), tripping cause indication (from the processing module to the bus), etc.

The communication module 4 is also connected to parts of the circuit breaker unit 1 which are representative of the state of the circuit breaker. This connection, of mechanical type (see FIGS. 5 and 6) is represented by 33 in FIG. 4. It enables a circuit breaker state indication circuit 34 and an operations counter 35 to be actuated. These two circuits 34 and 35 are connected to the driver 30, thus enabling these indications to be transferred to the bus 12.

The communication module 4 comprises in addition a circuit breaker control circuit 36 comprising an input connected to the output of the driver 30 and an output connected by the conductor 13 to the auxiliaries 14 and enabling remote control of the circuit breaker.

The communication module 4 can thus perform three independent functions, i.e. indication functions (33, 34, 35, 30, 29, 12), circuit breaker control functions (12, 29, 30, 36, 13) and remote measurement and setting functions (11, 31, 32, 30, 29, 12). This structure of the communication module ensures the independence of the different functions. The indication and circuit breaker control functions are thus performed by the communication module even in the absence of the processing unit. The communication module is standard for the essential part of its components, but adapted by the circuits 29 and 30 to suit the type of bus 12 to which the customer wishes to connect the circuit breaker. Transformation in the communication module 4 by the circuits 29 and 30 of the protocol suited to the bus 12 into a standardized protocol and vice-versa enables the circuit breaker to be adapted to the different types of bus without multiplying the variety of the processing modules. This adaptation may be carried out by the final customer who can fix the communication module onto the circuit breaker unit himself.

Figure 5:
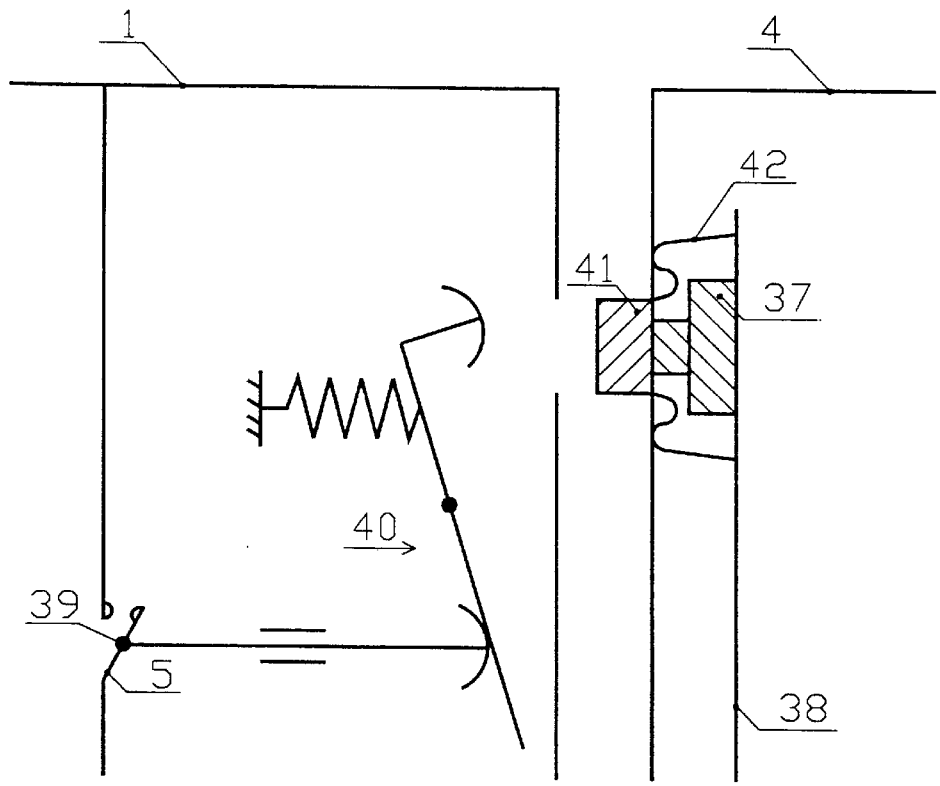
FIGS. 5 and 6 represent an alternative embodiment of a detail of achievement of the mechanical connection between the circuit breaker unit and the communication module, respectively in the open and closed position of the circuit breaker.
Figure 6:
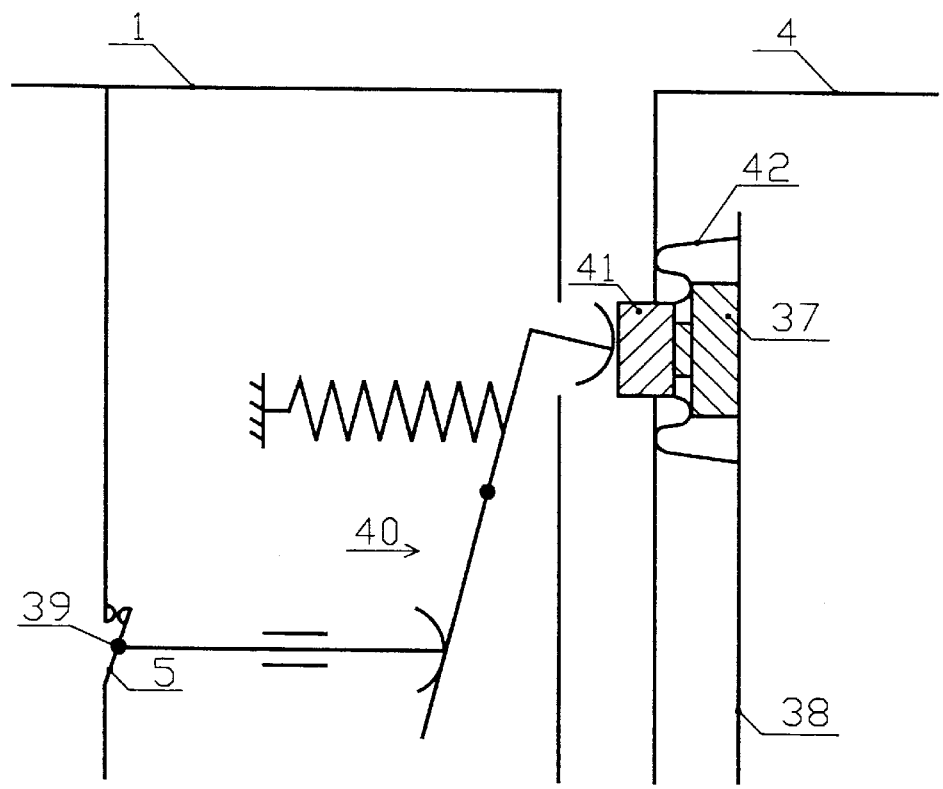

A particular embodiment of the mechanical connection 33 is represented in FIGS. 5 and 6. The mechanical connection is achieved by means of microcontacts 37, only one of which is represented, in cross section, in the figures in the form of a push-button mounted on a printed circuit board 38. In the communication module 4 represented, the non-depressed position of the microcontact 37 (FIG. 5) is representative of the open state of the breaking contacts of the circuit breaker, whereas its depressed position (FIG. 6) is representative of their closed state. The shaft of the circuit breaker poles 39, linked to the breaking contacts 5, actuates the microcontacts 37 by means of small rods 40 with return springs. A flexible membrane 41 encapsulates the microcontact 37. The flexible membrane comprises a part 42 permanently forming a seal inside the case of the module 4, around the opening formed in the case of the module 4 for the membrane 41 to pass through. The flexible membrane transmits the movement of the rods 40 to the microcontact 37 while preserving the tightness inside the communication module so as to prevent polluting breaking gases coming from the circuit breaker unit 1 from entering the module 4.

The force generated by the rod system on the microcontacts can be varied. Other microcontacts, operated in a similar way from the circuit breaker unit by a system of rods with return springs, enable different mechanical states of the circuit breaker to be indicated. It is thus possible not only to indicate the open/closed states of the circuit breaker but also the charged/discharged states of the operating mechanism of the circuit breaker, the fact that opening was caused by a fault detected by the processing unit, or the state of a locking part. All these mechanical states of the circuit breaker are thus transmitted, independently, to the communication module 4 where they are transformed into electrical signals and can be indicated either locally or remotely by the bus 12.

The use of a mechanical connection 33 between the circuit breaker unit and the communication module to perform the indication functions moreover enables the independent wiring of the processing unit to be limited.

Figure 7:
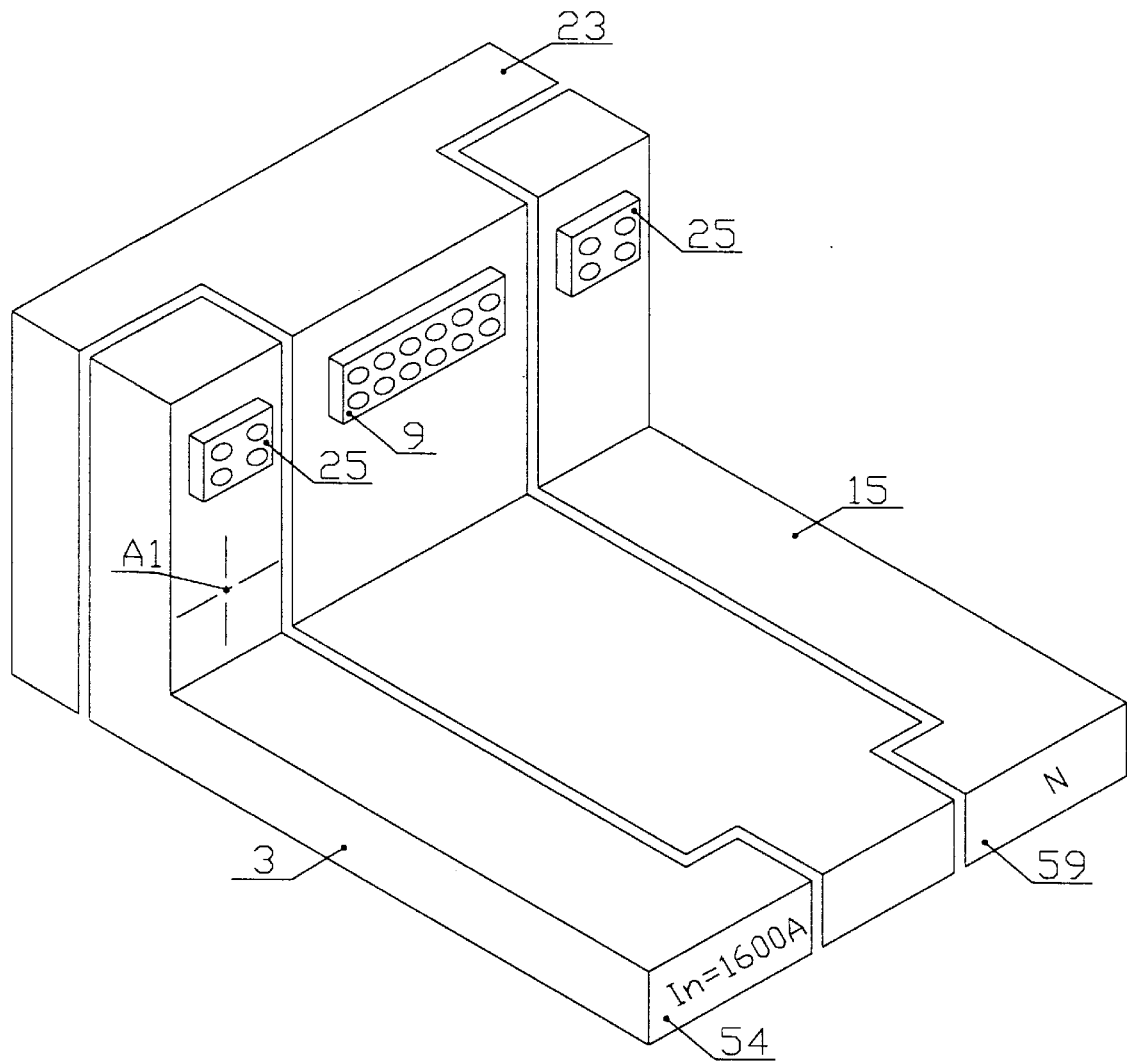
FIGS. 7 and 8 illustrate, respectively in perspective and in exploded top view, a particular embodiment of an interface, of a calibration module and of an additional module of a circuit breaker according to the invention.
Figure 8:
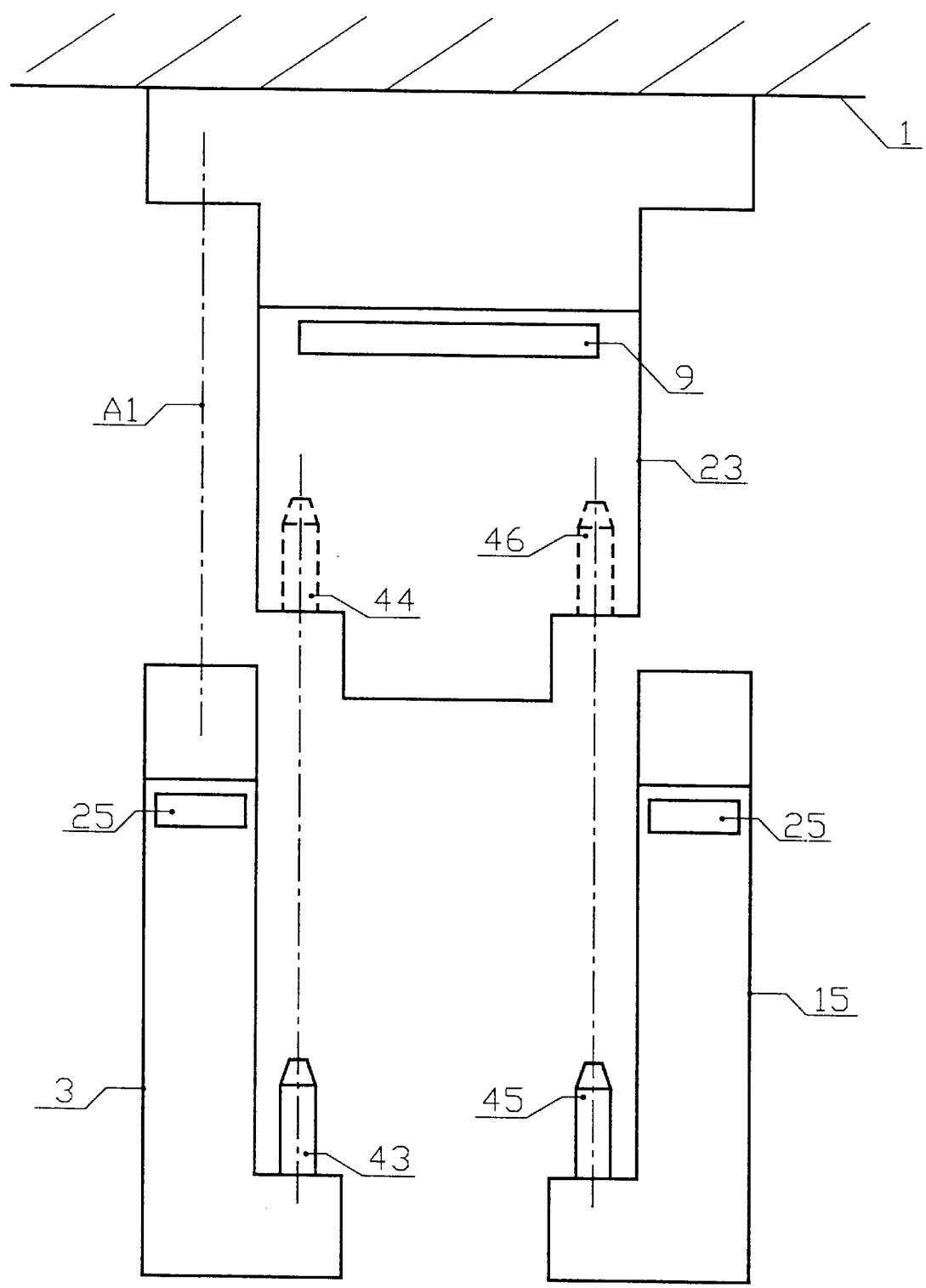

A preferred embodiment of the base, comprising the interface 23, the calibration module 3 and additional module 15, is represented in FIGS. 7 and 8. The calibration module 3 is fitted in removable manner on the base. For ease of fitting, the module 3 and interface 23 comprise complementary guiding parts. They also preferably comprise error prevention means. In FIG. 8, the guiding parts are formed by a guide pin 43 securely affixed to the calibration module and a complementary guiding orifice 44 of the interface 23. Fixing of the calibration module can be performed by any means enabling easy fitting and removal accessible to the customer after the processing module has been removed. Such fixing means may be formed by screws and are represented schematically in FIGS. 7 and 8 by the fixing axis A1. The additional module 15 also comprises guiding parts complementary to corresponding guiding parts of the interface and formed in FIG. 8 by a guide pin 45 complementary to a guiding orifice 46 of the interface. Fitting of the additional module 15 on the interface 23 is carried out in the plant. The additional module must not be able to be disassembled by the customer and the fixing means have to be chosen accordingly. As an example, the additional module is fixed to the interface, and consequently to the circuit breaker unit, by clipping. Such a fixing allows disassembly to be carried out in the plant should this be necessary.

Figure 9:
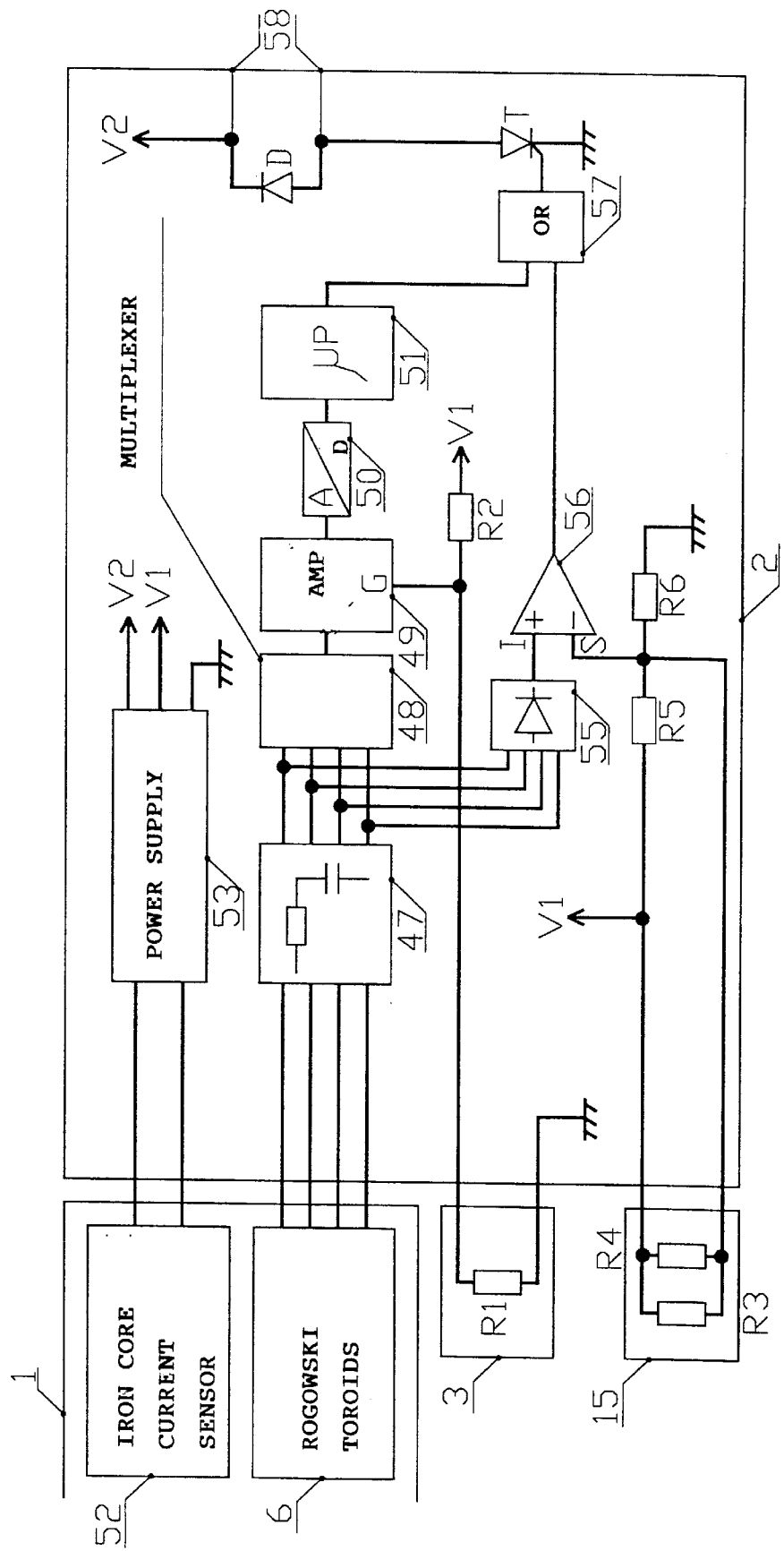
FIG. 9 represents, in block diagram form, the interactions between the processing module, the calibration module and the additional module of a particular embodiment of a circuit breaker according to the invention.

The functions of the calibration module and additional module will be explained in greater detail with reference to FIG. 9 which represents their interactions with the processing module 1. Only the elements of the processing module 2 necessary for understanding these interactions are represented in FIG. 9. In this embodiment, the current sensors 6 represented in FIG. 2 are formed by Rogowski toroids supplying signals representative of the derivative of the currents versus time. These signals are integrated into the module 2 by an integration circuit 47, which may be of RC type, whose output signals are representative of the currents in the conductors to be protected. The output of the integration circuit is connected in series to a multiplexer 48, an amplifier 49, an analog-to-digital converter 50 and a microprocessor-based processing circuit 51. When the current sensors 6 are Rogowski toroids, the power supplied is generally insufficient to supply the processing module. Current sensors 52 with iron cores are then added in the circuit breaker unit, connected to a power supply circuit 53 of the processing module 2 which notably supplies power supply voltages V1 and V2 with respect to ground. The voltage V1 is designed for power supply of the electronic circuits of the module 2, whereas the voltage V2, which is higher, is designed for power supply of the trip coil in case of tripping.

When the current sensors are constituted by Rogowski toroids, these toroids are identical whatever the circuit breaker rating. In known circuit breakers using this type of current sensor, the rating is fixed by the trip device. Different trip devices then have to be provided for the different circuit breaker ratings. The calibration module 3 makes it possible to avoid differentiation of the processing module 1 according to the circuit breaker rating. The calibration module 3 enables the gain of the amplifier 49 to be modified according to the rating chosen by the customer. The processing module then automatically takes the rating chosen into account when performing protection and/or measuring functions. In the embodiment represented in FIG. 9, the calibration module 3 comprises a resistor R1 which is connected between the ground and a gain control input G of the amplifier 49. The input G is connected to the voltage V1 by means of a resistor R2. The resistors R1 and R2 thus form a divider bridge and the value of the resistor R1 of the calibration module sets the value of the amplifier gain G, representative of the rating of the circuit breaker. As represented in FIG. 7, the calibration module 3 comprises a front panel 54 with indications representative of the rating (In) of the circuit breaker. These indications remain visible on the front panel when the processing module is fitted onto the interface 23. The customer is able to perform a rating change. To do this he simply has to remove the processing module 2 and replace the old calibration module by a new one having the required rating. This new rating, visible on the front panel, will automatically be taken into account by the processing module when the latter has been refitted.

The additional module 15 is designed to supply to the processing module the level of the analog maximum instantaneous threshold, or final instantaneous protection level, of the circuit breaker. This level is independent of the type of the processing module and of the circuit breaker rating. It depends on the type of circuit breaker only in so far as it is adapted to the electrodynamic withstand of the circuit breaker. This level linked to the circuit breaker is for example set by resistors R3, R4 located in the additional module.

FIG. 9 enables the role of the additional module 15 to be better understood. In the processing module 2, the outputs of the integration circuit 47 are connected to a rectifying circuit 55. An analog circuit, performing the instantaneous tripping function essentially comprises a comparison circuit 56. This circuit compares a threshold value S and a signal I supplied by the rectifying circuit 55 and representative of the maximum current flowing in the conductors to be protected.

If the microprocessor 51 detects a fault in the conductors to be protected, it supplies a tripping signal. In the event of an instantaneous fault, the fault is detected by the comparison circuit 56 of the analog circuit which produces a tripping signal. The tripping signals, whether they originate from the microprocessor 51 or from the circuit 56, are applied by means of an OR circuit 57 to the control electrode of an electronic switch. In FIG. 9 this switch is formed by a thyristor T whose trigger is connected to the output of the OR circuit 57. Its source is grounded and its drain is connected in series with a polarized or reverse diode D to the voltage V2. The drain of the thyristor T and the voltage V2 are connected to output terminals 58 of the processing module connected to the circuit breaker unit so as to control the trip coil 7.

The threshold S is obtained by a voltage divider formed in FIG. 9 by two resistors R5 and R6 connected in series between the voltage V1 and ground. The resistors R3 and R4 of the additional module 15 are connected in parallel to the resistor R5, thus defining the threshold S. This threshold can easily be modified. By eliminating one of the resistors R3 or R4, the threshold S decreases. With two resistors in an additional module, it is easy to obtain four different values of the threshold.

The calibration module and the additional module are naturally not limited to the particular embodiments of FIG. 9. It is in particular possible to provide in addition a larger number of resistors so as to increase the number of possible intermediate thresholds or gain values. It is also possible to connect two or more resistors in series and not in parallel in a module and to short-circuit the required resistors.

As represented in FIG. 7, the additional module 15 comprises a front panel 59 with indications representative of the breaking capacity of the circuit breaker. This breaking capacity, representative of the final instantaneous threshold, is generally expressed by a code. As an example, in FIG. 7, the normal breaking capacity is represented by the letter N. A higher breaking capacity can be represented by the letter H and a very high breaking capacity by the letter L.

In FIGS. 7 and 8, the calibration module 3 and the additional module 15 are arranged symmetrically with respect to the interface 23.

The use of an interface 23 connected to the circuit breaker unit and supporting the additional module 15 and the calibration module 3 makes the processing modules interchangeable. Use of the modules enables differentiation of the versions of the same circuit breaker to be performed at a late stage, and enables the customers' requirements to be matched simply.

The connection described above between the communication module 4 and the processing module 2 is an optical link. However the invention is not limited to this type of connection and extends to cover any type of connection with galvanic isolation, notably a connection of inductive type.

We claim:

1. A circuit breaker comprising: a circuit breaker unit, a removable processing module comprising an electronic processing unit and mechanically and electrically connected to the circuit breaker unit, a removable calibration module, comprising calibrating means, mechanically fixed to the circuit breaker unit and electrically connected to the processing unit, and communication means connected to an external communication bus, the circuit breaker comprising at least one removable communication module, distinct from the processing and calibration modules, comprising said communication means, mechanically fixed to the circuit breaker unit and connected to the processing unit by connection means with galvanic isolation, to parts of the circuit breaker unit representative of the state of the circuit breaker by mechanical connection means and to the external communication bus by electrical input/output connection means.

2. The circuit breaker according to claim 1, wherein the connection means with galvanic isolation are optical connection means.

3. The circuit breaker according to claim 2, wherein the communication module comprises indication means connected by the mechanical connection means to the circuit breaker unit, and remote measurement and/or remote setting means connected by the optical connection means to the processing unit, the indication, remote measurement and/or remote setting means being connected to the external communication bus by the electrical input/output connection means.

4. The circuit breaker according to claim 1, wherein the communication module comprises control means electrically connected to control auxiliaries of the circuit breaker, the control means being connected to the external communication bus by the electrical input/output connection means.

5. The circuit breaker according to claim 1, wherein the electrical input/output connection means comprise in the communication module means suited to a communication bus of predetermined type.

6. The circuit breaker according to claim 1, wherein the means for mechanical connection of the communication module to the parts of the circuit breaker unit representative of the state of the circuit breaker comprise microcontacts arranged in the communication module and having control parts protruding out from a panel of the communication module opposite the circuit breaker unit, and in the circuit breaker unit mechanical means for actuation of said control parts, the communication module comprising means for transforming the mechanical signals from the microcontacts into electrical signals and means for indicating the state of the circuit breaker.

7. The circuit breaker according to claim 6, wherein the control parts of the microcontacts each comprise a flexible, tight membrane covering the corresponding microcontact.

8. The circuit breaker according to claim 6, wherein the processing module comprises a variable gain amplifier connected to the output of the current measuring means and comprising a gain control input electrically connected to the calibration means of the calibration module.

9. The circuit breaker according to claim 1, wherein, the circuit breaker unit comprising current measurement means formed by Rogowski toroids whose output is connected to the processing module, the calibration module fitted in removable manner on the circuit breaker unit comprises a front panel with indications representative of the circuit breaker rating.

10. The circuit breaker according to claim 1, wherein, the processing module comprising analog final instantaneous protection means connected to current sensors of the circuit breaker unit and designed to compare to an analog maximum instantaneous threshold a value representative of the current supplied by the current sensors, the circuit breaker comprises an additional module comprising means for adjusting said threshold according to the type of circuit breaker, said additional module being mechanically fixed in unremovable manner on the circuit breaker unit, electrically connected to the processing unit and comprising a panel bearing indications representative of the breaking capacity of the circuit breaker.

11. The circuit breaker according to claim 10, comprising means for fitting the calibration module and the additional module, said means for fitting comprising an interface securedly affixed to the circuit breaker unit and comprising guiding means and fixing means complementary to guiding means and fixing means of the calibration module and additional module.

12. The circuit breaker according to claim 11, wherein the calibration module and the additional module are arranged symmetrically with respect to the interface.

* * * * *

UNITED STATES PATENT AND TRADEMARK OFFICE
CERTIFICATE OF CORRECTION

PATENT NO. : 5,877,691
DATED : March 2, 1999
INVENTOR(S) : Eric SUPTITZ, Henri BELLOTTO, Luc WEYNACHTER, Patrice ALLIN It is certified that error appears in the above-indentified patent and that said Letters Patent is hereby corrected as shown below:

On the title page, column 1, [30] Foreign Application Priority Data: change "Nov. 15, 1997" to --Nov. 15, 1996--.

Signed and Sealed this

Fifteenth Day of June, 1999

Attest:

Q. TODD DICKINSON

Attesting Officer

Acting Commissioner of Patents and Trademarks